Jan. 24, 1933.  J. BRYKOWICZ  1,895,123
AUTOMOBILE DIRECTION INDICATOR
Filed June 19, 1929
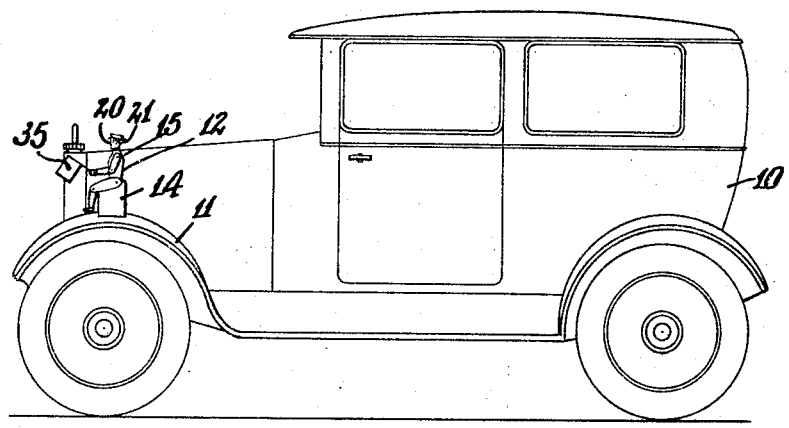
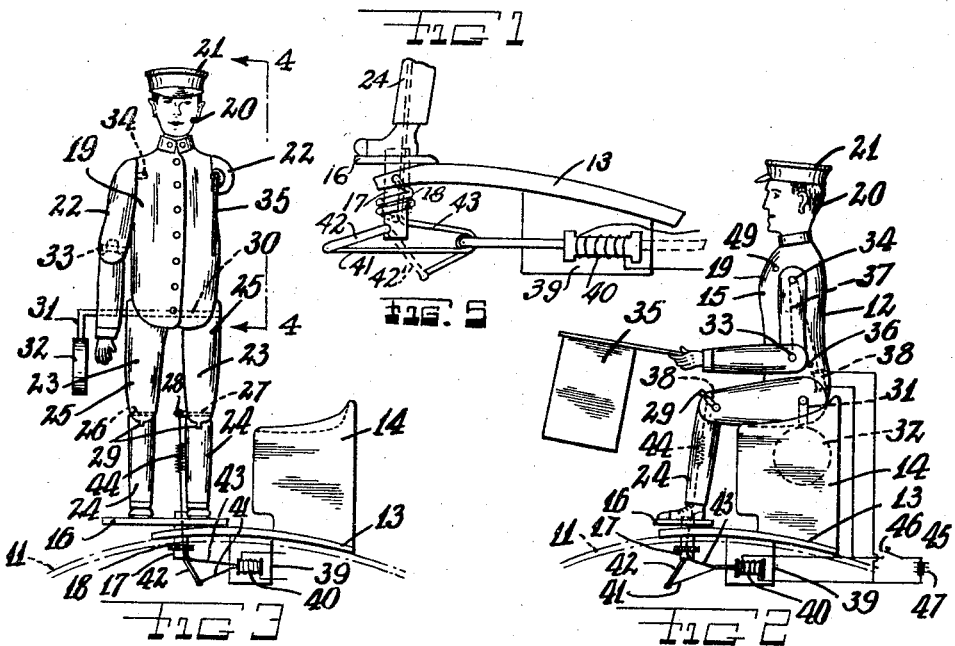
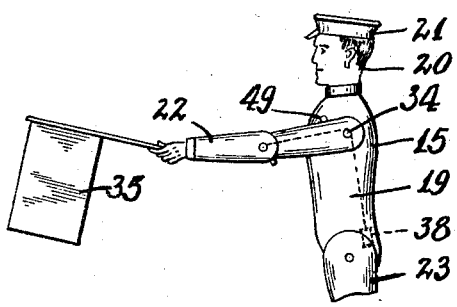
INVENTOR
John Brykowicz
BY
ATTORNEY Patented Jan. 24, 1933

1,895,123

UNITED STATES PATENT OFFICE

JOHN BRYKOWICZ, OF WETASKIWIN, ALBERTA, CANADA

AUTOMOBILE DIRECTION INDICATOR

Application filed June 19, 1929. Serial No. 372,207.

This invention relates to new and useful improvements in automobile direction indicators.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of an automobile provided with the indicator.

Fig. 2 is an enlarged detail side elevational view of the indicator shown in Fig. 1, and schematic wiring being applied to this figure.

Fig. 3 is a view similar to Fig. 2 except showing the indicator in another position.

Fig. 4 is a fragmentary side elevational view looking in the direction of the arrows 4—4 of Fig. 3.

Fig. 5 is an enlarged detailed fragmentary view of a portion of Fig. 2.

The reference numeral 10 indicates generally a motor vehicle of any type and construction and preferably having mud guards 11. A directional indicator 12 is shown mounted upon the front mud guard. Preferably one of these indicators should be mounted on the right mud guard and another on the left.

The indicator 12 consists of a base plate 13 for attachment upon the mud guard, a seat 14 secured upon the base plate and a figure of a police officer 15 mounted upon the base plate and normally sitting on the seat 14.

The figure 15 consists of a support plate 16 with a bottom pintle support 17 rotatively mounted thru the base plate 13 and thru the mud guard 11. This pintle support should be directly beneath the left foot of the figure 15. A spiral spring 18 is connected between the pintle support 17 and the base plate 13 and is arranged to normally urge the figure so as to be facing frontwards relative to the front of the vehicle 10. The spring 18 should be arranged to permit the support plate 16 and the figure 15 to be moved so as to be directed to one side of the vehicle 10, either to the right or to the left depending upon whether the indicator is mounted upon the right or the left mud guard.

The figure 15 has a body 19 which includes a head 20 and a cap 21, arms 22 and legs 23. The portions of the legs beneath the knee indicated by reference numerals 24 are firmly fixed upon the plate 16 and are arranged in a vertical position. The portions of the legs above the knee are indicated by reference numeral 25. The portion 25 of the right leg is pivotally mounted by a pin 26 to the portion 24. A pin 27 is firmly nonrotatively fixed in the portion 25 of the left leg and is rotatively mounted in the portion 24. The pin 27 has an offset end 28. Stops 29 project from the leg portions 25 and abut against the leg portions 24 when the portions 25 are in vertical positions, that is when the figure 15 is in a standing position. These stops permit rearward rotation of the portions 25 so that the figure may assume a sitting position.

A pin 30 is nonrotatively fixed in the body 19 and rotatively connects the body with the tops of the leg portions 25. The pin 30 has an offset end 31, and a weight 32 is attached upon this end. This weight is so positioned for normally maintaining the body 19 in a vertical position regardless whether the figure 15 is in its sitting or standing position. The right arm 22 is pivoted at the elbow by a pin 33 and is pivotally mounted upon the body at the shoulder by a pin 34. The left arm 22 similarly is pivotally mounted on the shoulder of the body 19 by a pin 34 and is formed of two sections pivoted together at the elbow by a pin 33. This left arm holds a flag 35. A stop 36 projects from one of the sections of the left arm 22 and is engageable against the other section of the arm for holding the arm in a straight horizontal position when the section nearer the shoulder is moved to a horizontal position.

A cord 37 is attached upon the pin 33 of the left arm and extends over the pin 34 and connects with the movable core of a solenoid 38 fixed within the body 19. A plate 39 is attached upon the base plate 13 and supports a second solenoid 40. A cable 41 connects with the movable core of this solenoid and with an inclined arm 42 rigidly attached upon the pintle support 17. Upon energization of the solenoid 40, the cable 41 draws the arm 42 around through an angle of about 90° lifting the arm in the position illustrated by the dot and dash lines 42'. The motion of the arm 42 revolves the pintle 17 which turns the support plate 16, bringing the figure 15 around through an angle of about 90°. When the current to the solenoid 40 is cut off, the spring 18 turns the figure 15 around to its original position. Another cable 43 connects with the movable core of the solenoid 40 and extends upward and is connected with the offset portion 28 of the pin 27. A spring 44 is interposed intermediate the ends of the cable 43. Solenoids 38 and 40 are electrically connected in a circuit 45 including a switch 46 and a battery 47 so as to be simultaneously energized upon the closing of the switch. A pin 49 projects from the body 19 and limits upward movement of the left arm 22 to a horizontal position as shown in Fig. 4.

In operation of the device it is normally in a position as shown in Figs. 1 and 2. The switch 46 is in the vicinity of the driver of the vehicle and when he intends to make a turn, he closes the switch. Solenoid 40 becomes energized and its core moves inwards drawing upon the cable 41 and the arm 42 for rotating the figure thru an angle of 90 degrees so that it faces to one side of the vehicle. As the core of the solenoid 40 moves inwards, cable 43 is also drawn which moves the offset portion 28 of the pin 27 thru an arc for causing the figure 15 to stand erect. Attention is called that the pin 27 is rotatively connected in the lower leg portion 24 and is fixed against rotation to the upper leg portion 25 so as to move this leg portion upon rotation. When the portion 25 assumes a vertical position, the body 19 will also be moved to a raised position but will continually maintain a vertical position since the weight 32 under the action of gravity always maintains its vertical position. The pin 30 being rigidly connected against rotation to the body 19, the body must follow rotation of the pin, while the pin 30 is rotatively mounted in the tops of the leg portions 25.

Simultaneous with the closing of the switch 46, the solenoid 38 is also energized. When the core of this solenoid moves inwards the cable 37 is drawn upon for raising the left arm 22. Attention is called that the stop 36 on the inner section of the arm 22 acts against the outer section of the arm for lifting the outer section into a horizontal position. Pin 49 restrains complete raising of the arm and assures only the horizontal position.

When the switch 46 is opened the solenoids 38 and 40 lose their acting strengths. Immediately, spring 18 acts to rotate the figure back to its original position, weight 32 acts to cause the figure to again assume its original sitting position which is possible since the core of the solenoid 40 is now free to move outwards. The weight of the arm 22 causes it to assume its original bent position which also is possible since the core of the solenoid 38 is now free to move outwards.

While I have shown and described the preferred embodiment of my invention, it is to be understood that I do not limit myself to precise construction herein disclosed and the right is reserved to all changes and modifications coming within the scope of the invention as defined in the appended claims.

Having thus described my invention, what I claim as new, and desire to secure by United States Letters Patent is:—

1. In a signaling device of the class described, a base plate with a seat, a support plate pivotally mounted on the base plate, a figure mounted on the support plate and arranged to normally sit on the seat, said figure including a body portion, legs pivotally connected on the lower end of the body and formed of two sections pivotally joined, a pintle support fixed to the support plate and rotatively mounted through said base plate, an arm rigidly attached on the pintle support for turning the same, means connected between the pintle support and the base plate normally urging the figure to assume a frontward position, a pin rigidly attached to the upper portion of one of said legs and rotatively mounted in the lower portion of said leg, a weight attached on the body and extending below the pivotal connection of said body and legs for the purpose of maintaining the body in a vertical position, and means for moving said pintle support arm and said leg pin to cause said figure to rise and turn.

2. In a signaling device of the class described, a base plate with a seat, a support plate pivotally mounted on the base plate, a figure mounted on the support plate and arranged to normally sit on the seat, said figure including a body portion, legs pivotally connected on the lower end of the body and formed of two sections pivotally joined, a pintle support fixed to the support plate and rotatively mounted through said base plate, an arm rigidly attached on the pintle support for turning the same, a spiral spring connected between the pintle support and the base plate normally urging the figure to assume a frontward position, a pin rigidly attached to the upper portion of one of said legs and rotatively mounted in the lower portion of said leg, a weight attached on the body and extending below the pivotal connection of said body and legs for the purpose of maintaining the body in a vertical position, and means including a solenoid for moving said pintle support arm and said leg pin to cause said figure to rise and turn.

In testimony whereof I have affixed my signature.

JOHN BRYKOWICZ.